(12) United States Patent
Lee et al.

(10) Patent No.: US 7,332,897 B2
(45) Date of Patent: Feb. 19, 2008

(54) DC-DC CONVERTER

(75) Inventors: Sang-Gil Lee, Seoul (KR); Jong-Seo Lee, Hwaseong-si (KR); Gi-Cherl Kim, Yongin-si (KR); Sang-Yu Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 157 days.

(21) Appl. No.: 11/188,154

(22) Filed: Jul. 22, 2005

(65) Prior Publication Data

US 2006/0022649 A1    Feb. 2, 2006

(30) Foreign Application Priority Data

Jul. 28, 2004    (KR)    ............... 10-2004-0059239

(51) Int. Cl.
*G05F 1/613* (2006.01)
*G05F 3/16* (2006.01)

(52) U.S. Cl. ...................... 323/222; 323/225

(58) Field of Classification Search ........ 323/222–225, 323/265, 268, 271, 282, 351
See application file for complete search history.

(56) References Cited

U.S. PATENT DOCUMENTS 5,457,379 A * 10/1995 Jacobs et al. ............... 323/222
5,815,386 A *  9/1998 Gordon ......................... 363/50
6,788,032 B2 *  9/2004 Chan et al. .................. 323/222
7,049,793 B2 *  5/2006 Itoh et al. .................... 323/222

* cited by examiner

*Primary Examiner*—Gary L Laxton
(74) *Attorney, Agent, or Firm*—Cantor Colburn LLP

(57) ABSTRACT

A DC-DC converter includes a main inductor connected to an input voltage, a main switching element connected in series to the main inductor, a main diode connected to the main inductor and a load, and a main capacitor connected to the main diode and the load, the DC-DC converter changing the input voltage to output a changed input voltage as an output voltage. The DC-DC converter further includes an oscillator connected between the main inductor and the main diode, an auxiliary switching element connected to the oscillator, the auxiliary switching element changing an operation state based on an externally applied control signal to control the oscillator, and a diode unit connected to the oscillator and the auxiliary switching element and controlling current flow based on operations of the oscillator and the auxiliary switching element to change the output voltage. The main switching element and the main diode are to be zero voltage switching or zero current switching in accordance with the operations of the oscillator and the auxiliary switching element.

14 Claims, 10 Drawing Sheets

DC-DC CONVERTER

This application claims priority to Korean Patent Application No. 10-2004-0059239, filed on Jul. 28, 2004 and all the benefits accruing therefrom under 35 U.S.C. § 119, and the contents of which in its entirety are herein incorporated by reference.

BACKGROUND OF THE INVENTION (a) Field of the Invention

The present invention relates to a display device, a driving apparatus of a light source for the display device, and a DC-DC converter.

(b) Description of the Related Art

Display devices used for monitors of computers and television sets include self-emitting displays such as light emitting diodes ("LEDs"), electroluminescence ("EL") devices, vacuum fluorescent displays ("VFDs"), field emission displays ("FEDs"), and plasma panel displays ("PDPs"), and non-emitting displays such as liquid crystal displays ("LCDs") requiring a light source.

An LCD includes two panels provided with field-generating electrodes and a liquid crystal ("LC") layer with dielectric anisotropy interposed therebetween. The field-generating electrodes are supplied with electric voltages and generate an electric field in the LC layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD or may be natural light.

A lighting device for an LCD, i.e., a backlight unit, usually includes a plurality of fluorescent lamps such as external electrode fluorescent lamps ("EEFLs") and cold cathode fluorescent lamps ("CCFLs"), or a plurality of light emitting diodes ("LEDs"), as light sources, which uniformly transmit the light to the entire front surface of the LC panels from the rear thereof.

When using the fluorescent lamps, characteristics of elements of the display device are deteriorated due to large power consumption and heating.

In addition, the fluorescent lamps have a stick shape that are susceptible to breakage on impact. Moreover, since temperatures of the lamps vary in accordance with positions thereof, to make luminance of the lamps vary, image quality of the LCD decreases.

However, when using LEDs, since each LED is a semiconductor device, the lifetime of the LED is long, the lighting speed of the LED is fast, and the power consumption is low. The LED also withstands impacts well and miniaturization thereof is easy.

Because of these benefits, LEDs are equipped in monitors for middle or large sized LCDs such as for computers or television sets, as well as in small sized LCDs such as in mobile telephones, for a light source.

Fluorescent lamps are activated by an alternate current ("AC") voltage, but the LEDs are activated by a direct current ("DC") voltage. Accordingly, for using the LEDs, the backlight unit includes a DC-DC converter for converting an AC voltage into a DC voltage and changing the DC voltage to a predetermined magnitude. The DC-DC converter may be a boost converter.

In the DC-DC converter, which includes a semiconductor switching element and a diode, a switching loss such as a turn-on switching loss or turn-off switching loss occurs in turning-on or turning-off of the switching element such that power consumption increases.

To decrease the power consumption, a soft switching method is proposed. The soft switching method includes a zero voltage switching type and a zero current switching type.

The zero voltage switching type is adapted to majority-carrier semiconductor elements having a large turn-on switching loss, and the zero current switching type is adapted to minority-carrier semiconductors having a large turn-off switching loss.

However, although the soft switching method is used, voltage and current stress of the switching element increases due to oscillation by a capacitor and an inductor such that switching availability is decreased and a conduction loss is generated. The soft switching method still has current stress due to a reverse recovery characteristic, which is a reverse current known as "a diode reverse recovery current" that flows in the diode for discharging charges charged in the diode in turning-on of the diode.

BRIEF SUMMARY OF THE INVENTION

In an embodiment of the present invention, a DC-DC converter including a main inductor connected to an input voltage, a main switching element connected in series to the main inductor, a main diode connected to the main inductor and a load, and a main capacitor connected to the main diode and the load, the DC-DC converter changing the input voltage to output a changed input voltage as an output voltage is provided, and further includes an oscillator connected between the main inductor and the main diode, an auxiliary switching element connected to the oscillator, of which an operation state is changed based on an externally applied control signal to control the oscillator, and a diode unit connected to the oscillator and the auxiliary switching element and controlling current flow based on operations of the oscillator and the auxiliary switching element to change the output voltage, wherein the main switching element and the main diode are to be zero voltage switching or zero current switching in accordance with the operations of the oscillator and the auxiliary switching element.

The oscillator may include a first capacitor connected in parallel to the main switching element, a first inductor connected between the first capacitor and the main diode, and a second inductor connected between the first capacitor and the auxiliary switching element.

The main switching element may be a semiconductor device of a type different from that of the auxiliary switching element.

The auxiliary switching element may be a metal oxide silicon field effect transistor ("MOSFET").

The diode unit may include a first diode connected to the oscillator and the auxiliary switching element and controlling the current flow based on the operations of the oscillator and the auxiliary switching element and a second diode connected to the oscillator and the auxiliary switching element and controlling a current flow from the oscillator into the load based on an operation of the auxiliary switching element.

The second diode may be a diode for clamping.

In a further embodiment of the present invention, a driving apparatus of a display device including a light source unit having a plurality of light sources, the driving apparatus is provided, and further includes a power supply applying a driving voltage for driving the light sources, and a control signal outputting a first control signal controlling the power supply and a second control signal controlling the light sources, the driving apparatus controlling operations of the light sources by the driving voltage based on the second control signal, wherein the power supply comprises a DC-DC converter having a main switching element of which operation is changed by the first control signal, a main diode connected to the light source unit, an oscillator connected between the main switching element and the main diode, and an auxiliary switching element connected to the oscillator and controlling operation of the oscillator, the DC-DC converter boosting an input DC voltage to the driving voltage with a predetermined magnitude, and applying the boosted driving voltage to the light source unit, wherein the DC-DC converter is to be zero voltage switching or zero current switching of the main switching element and the main diode in accordance with operations of the oscillator and the auxiliary switching element.

The oscillator may include a first capacitor connected in parallel to the main switching element; a first inductor connected to the first capacitor, and a second inductor connected between the first capacitor and the auxiliary switching element.

The power supply may further include a rectifier changing an externally supplied AC voltage into a DC voltage and a smoother smoothing the DC voltage from the rectifier and outputting the smoothed DC voltage as the input DC voltage.

The power supply may further include a filter filtering noises included in the AC voltage.

The DC-DC converter may further include a third inductor connected to the input DC voltage, a first diode connected to the auxiliary switching element and the first inductor, a second diode connected to the second inductor, and a second capacitor connected to the main diode and the second diode.

The main switching element may be a semiconductor device of a type different from that of the auxiliary switching element.

The auxiliary switching element may be a metal oxide silicon field effect transistor ("MOSFET").

The light sources may include LEDs (light emitting diodes) of at least one red, green, and blue colors.

In a still further embodiment of the present invention, a DC-DC converter includes a first inductor connected to an input end, a first switching element connected to the first inductor and the input end, a first diode connected between the first inductor and an output end, a first capacitor connected between the first diode and the output end, an oscillating unit connected between the first inductor and the first diode, a second switching element connected to the oscillating unit, a second diode connected between the second switching element and the input end, and a third diode connected between the oscillating unit and the first diode.

The oscillating unit may include a second capacitor connected to the first inductor, a second inductor connected between the second capacitor and the second diode, and a third inductor connected between the second capacitor and the second switching element.

The first switching element may be a semiconductor device of a type different from that of the second switching element.

The second switching element may be a metal oxide silicon field effect transistor ("MOSFET").

In a still further embodiment of the present invention, a display device including a plurality of pixels, a lamp unit emitting light based on a lamp control signal, and a power supply applying a driving voltage for driving the lamp unit is provided, and further includes a main inductor connected to an input voltage, a main switching element of which operation is changed based on an externally applied control signal, a main diode connected to the lamp unit, an oscillator connected between the main switching element and the main diode, and an auxiliary switching element connected to the oscillator and controlling the oscillator, wherein the main switching element and the main diode are to be zero voltage switching or zero current switching in accordance with the operations of the oscillator and the auxiliary switching element.

The oscillator may include a first capacitor connected in parallel to the main switching element, a first inductor connected to the first capacitor, and a second inductor connected between the first capacitor and the auxiliary switching element.

In another embodiment of the present invention, a method of reducing a switching loss in a first switching element of a DC-DC converter includes diverting current away from the first switching element when the first switching element is being turned on or off, wherein the first switching element is at both zero current and zero voltage when being turned on or off.

BRIEF DESCRIPTION OF THE DRAWINGS

The present invention will become more apparent by describing embodiments thereof in detail with reference to the accompanying drawings, in which.

DETAILED DESCRIPTION OF THE INVENTION

Figure 1:
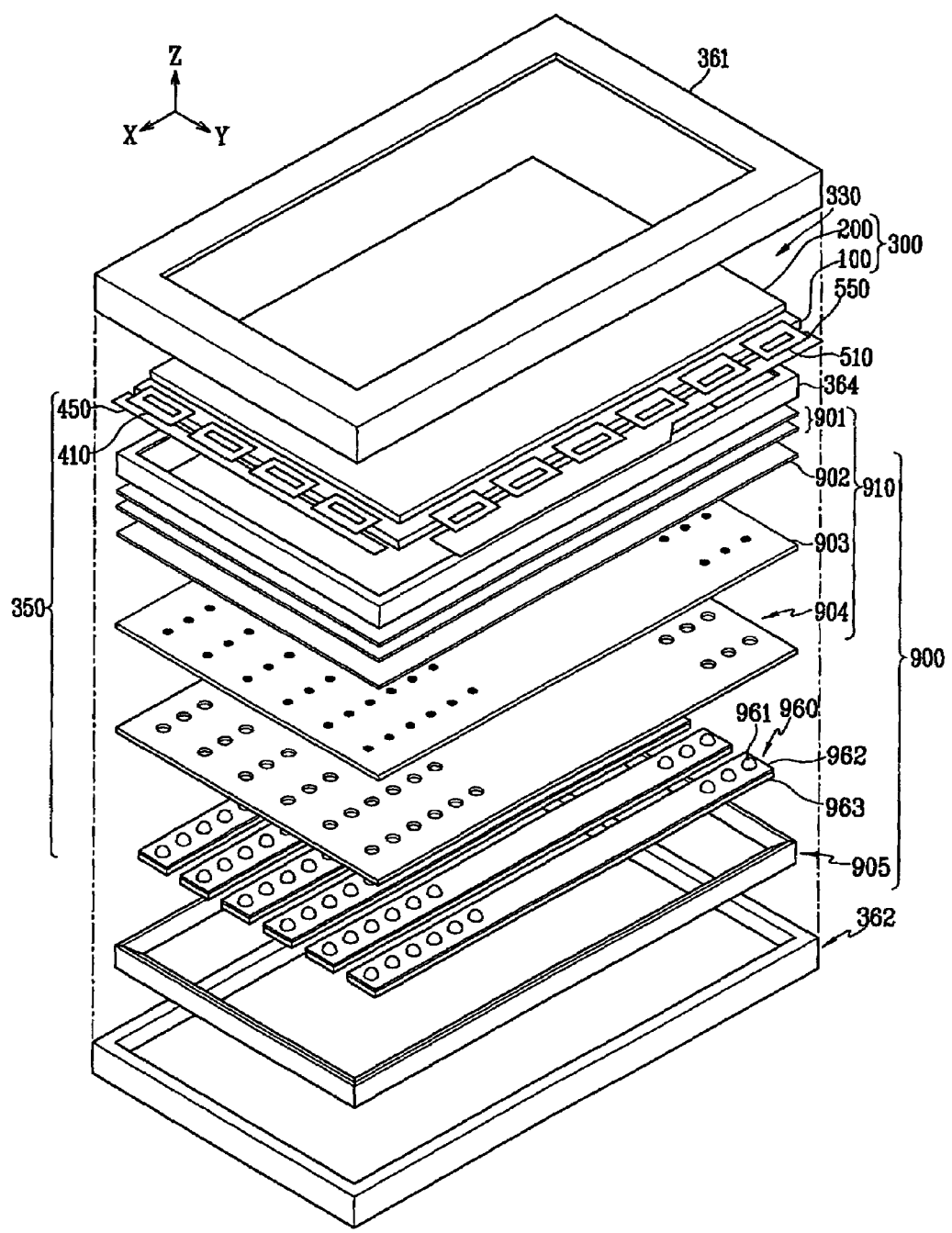
FIG. 1 is an exploded perspective view of an exemplary embodiment of an LCD according to the present invention.

The present invention will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region, or substrate is referred to as being "on" another element, it can be directly on the other element or intervening elements may also be present. In contrast, when an element is referred to as being "directly on" another element, there are no intervening elements present.

A display device, a driving apparatus of a light source for the display device, and a DC-DC converter according to embodiments of the present invention will be described with reference to the accompanying drawings.

A liquid crystal display ("LCD") according to an embodiment of the present invention is described in detail with reference to FIGS. 1-4.

Figure 2:
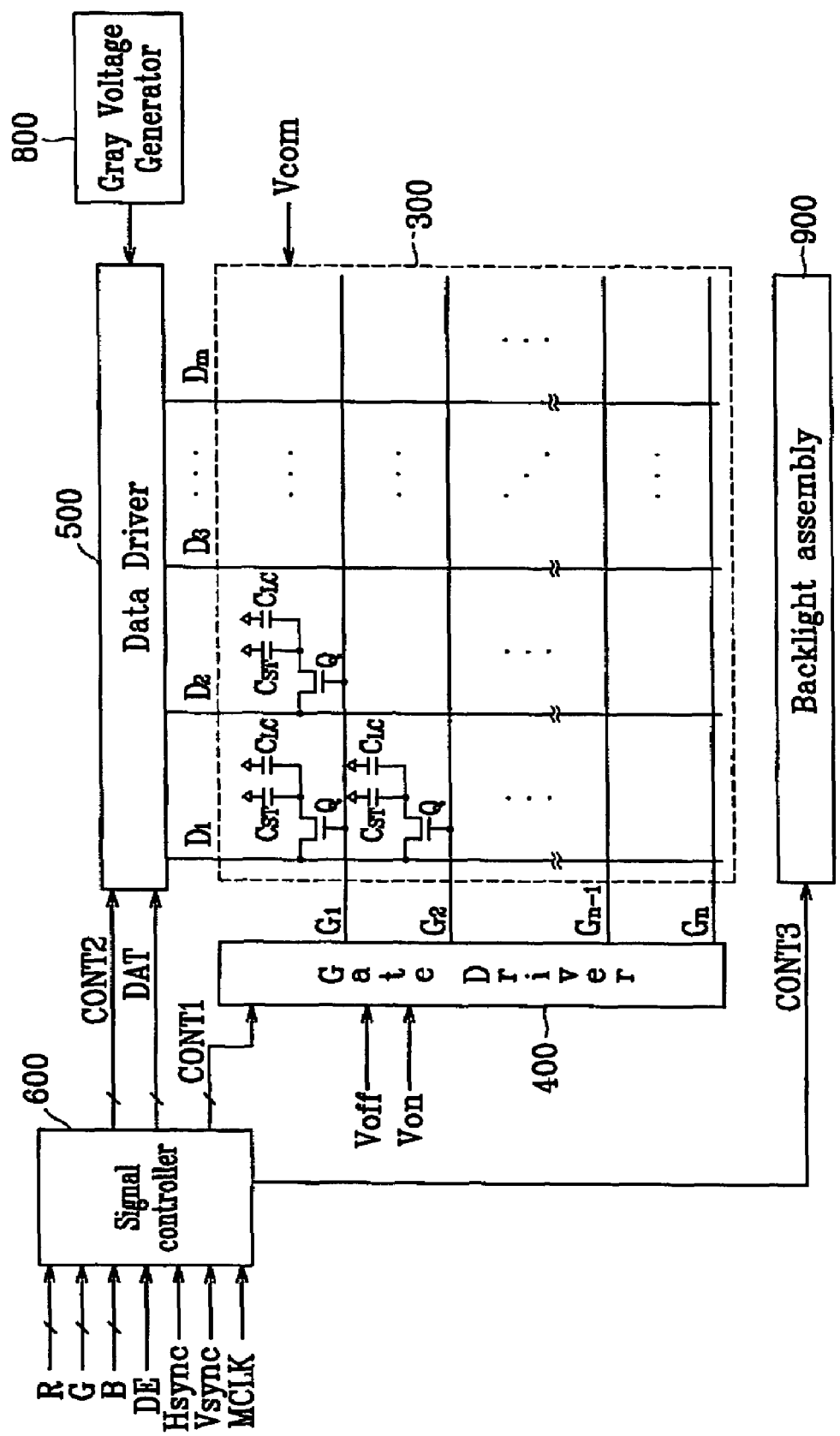
FIG. 2 is a block diagram of an exemplary part of the LCD shown in FIG. 1.
Figure 3:
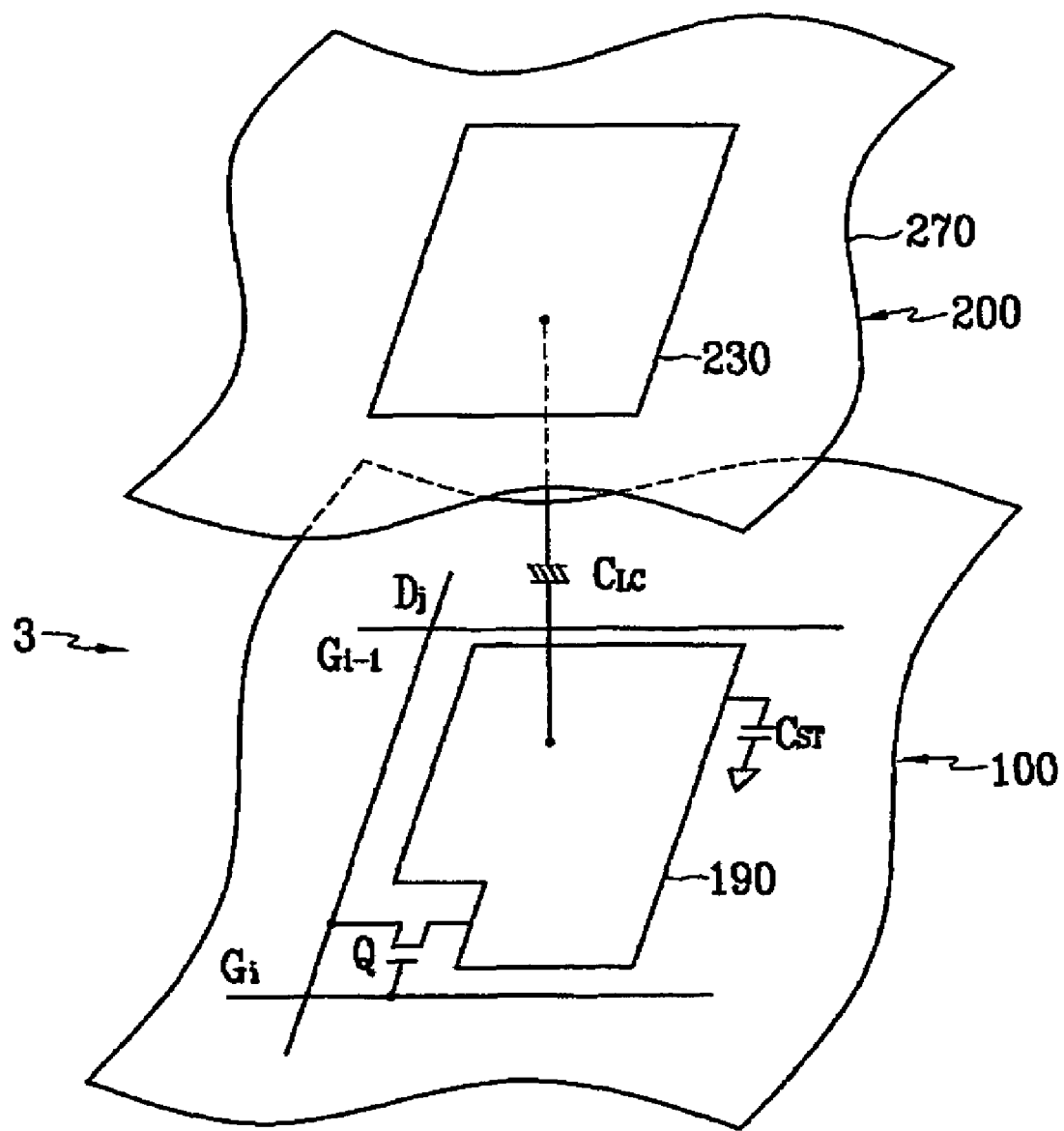
FIG. 3 is an equivalent circuit diagram of an exemplary pixel of the LCD shown in FIG. 1.
Figure 4:
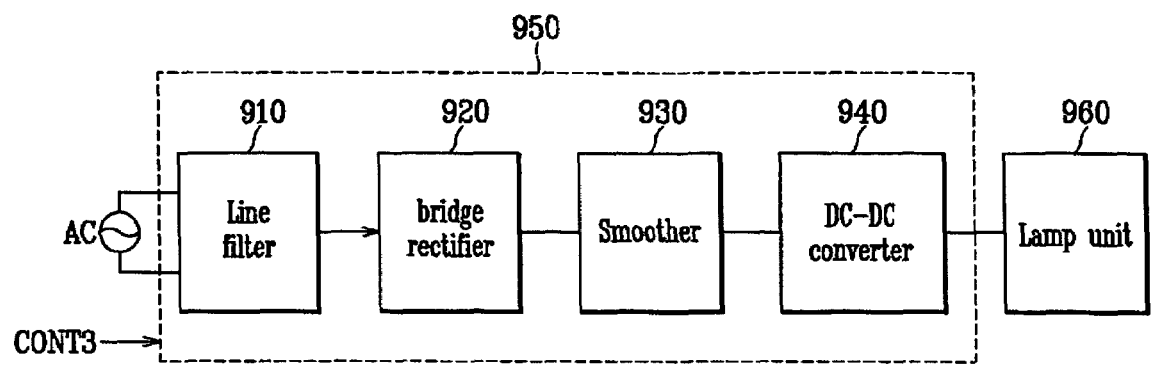
FIG. 4 is a block diagram of an exemplary embodiment of a backlight unit according to the present invention.

FIG. 1 is an exploded perspective view of an exemplary embodiment of an LCD according to the present invention, FIG. 2 is a block diagram of an exemplary part of the LCD shown in FIG. 1, and FIG. 3 is an equivalent circuit diagram of an exemplary pixel of the LCD shown in FIG. 1. FIG. 4 is a block diagram of an exemplary backlight assembly according to an embodiment of the present invention.

Referring to FIG. 1, the LCD includes a display module 350 including a display unit 330 and a backlight assembly 900, and a pair of front and rear chassis 361 and 362 and a mold frame 364.

The display unit 330 includes an LC panel assembly 300, a plurality of gate tape carrier packages ("TCPs") or chip-on-film ("COF") type packages 410, a plurality of data TCPs 510 attached to the LC panel assembly 300, and a gate printed circuit board ("PCB") 450 and a data PCB 550 attached to the gate and the data TCPs 410 and 510, respectively.

The LC panel assembly 300 includes a lower panel 100, an upper panel 200, and a liquid crystal layer 3 interposed therebetween as shown in FIG. 3.

The LC panel assembly 300 includes a plurality of display signal lines G1-Gn and D1-Dm and a plurality of pixels connected thereto and arranged substantially in a matrix in circuital view.

The display signal lines G1-Gn and D1-Dm are disposed on the lower panel 100 and include a plurality of gate lines G1-Gn transmitting gate signals (also referred to as "scanning signals"), and a plurality of data lines D1-Dm transmitting data signals. The gate lines G1-Gn extend substantially in a row direction and are substantially parallel to each other, while the data lines D1-Dm extend substantially in a column direction and are substantially parallel to each other.

Each pixel includes a switching element Q connected to the display signal lines G1-Gn and D1-Dm, and an LC capacitor $C_{LC}$ and a storage capacitor $C_{ST}$ connected to the switching element Q. The storage capacitor $C_{ST}$ may be omitted in certain embodiments.

The switching element Q, such as a TFT, is disposed on the lower panel 100. The switching element Q has three terminals including a control terminal connected to one of the gate lines G1-Gn, an input terminal connected to one of the data lines D1-Dm, and an output terminal connected to the LC capacitor $C_{LC}$ and the storage capacitor $C_{ST}$.

The LC capacitor $C_{LC}$ includes a pixel electrode 190 provided on the lower panel 100 and a common electrode 270 provided on the upper panel 200, as two terminals. The LC layer 3, disposed between the two electrodes 190, 270, functions as a dielectric of the LC capacitor $C_{LC}$. The pixel electrode 190 is connected to the switching element Q, and the common electrode 270 is supplied with a common voltage Vcom and covers an entire surface, or substantially the entire surface, of the upper panel 200. Alternatively, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line provided on the lower panel 100. The storage capacitor $C_{ST}$ also overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of the red, blue, and green colors (i.e., spatial division) or each pixel sequentially represents the red, blue, and green colors in turn (i.e., temporal division) such that spatial or temporal sum of the primary colors are recognized as a desired color. An example of a set of the colors includes red, green, and blue colors, however alternate color sets may be employed. FIG. 3 shows an example of the spatial division in which each pixel includes a color filter 230 representing one of the red, blue, and green colors in an area of the upper panel 200 facing the pixel electrode 190. Alternatively, the color filter 230 is provided on or under the pixel electrode 190 on the lower panel 100.

As shown in FIGS. 1 and 2, the gate TCPs 410 are types of flexible printed circuit ("FPC") films and are attached at an edge of the lower panel 100 of LC panel assembly 300. The gate TCPs 410 mount gate integrated circuit ("IC") chips forming a gate driver 400, and the data TCPs 510 mount data IC chips forming a data driver 400. The gate driver 400 and the data driver 500 are electrically connected to the gate lines G1-Gn and the data lines D1-Dm of the LC panel assembly 300 through signal lines (not shown) formed on the TCPs 410 and 510, respectively.

The gate driver 400 generates gate signals including a gate-on voltage Von and a gate-off voltage Voff for application to the gate lines G1-Gn, and the data driver 500 applies data voltages to the data lines D1-Dm.

Alternatively, the driving IC chips for the gate driver 400 and the data driver 500 may be directly mounted on the panel assembly without TCPs, which is called a "chip on glass" ("COG") type of mounting. The gate driver 400 or the data driver 500 may be formed on the LC panel assembly 300 in company with the switching elements Q, the display signal lines G1-Gn, and the data lines D1-Dm.

The gate PCB 450 is attached to the TCPs 410 in a longitudinal direction along an edge of the lower panel 100, and the data PCB 550 is attached to the TCPs 510 in a longitudinal direction along another edge of the lower panel 100. As shown in FIG. 2, the gate PCB 450 and the data PCB 550 mount a gray voltage generator 800 and a signal controller 600 as well as signal lines (not shown). The gray voltage generator 800 generates two sets of gray voltages related to the transmittance of the pixels, and applies gray voltages to be selected as the data voltages to the data driver 500.

The signal controller 600 controls the drivers 400 and 500, sends signals to the backlight assembly 900, etc.

As shown in FIGS. 1, 2, and 4, the backlight assembly 900 includes a lamp unit 960 housed in the rear chassis 362 and fixed thereto and disposed on the LC panel assembly 300, a plurality of optical components 910 disposed between the LC panel assembly 300 and the lamp unit 960 for adjusting light emitting form the lamp unit 960, and a power supply 950 applying a supply voltage to the lamp unit 960. The backlight assembly 900 also includes a supporting frame 905 housed in the rear chassis 362 to fix the lamp unit 960. The supporting frame 905 is fixed to the mold frame 364.

The lamp unit 960 includes a plurality of PCBs 962 that mount a plurality of LEDs 961, respectively, and radiant heat members 963 attached to the PCBs 962 to radiate heat. The radiant heat members 963 are preferably made of heat conduction materials. Each PCB 962 is arranged horizontally along a longitudinal axis, and mounts in turn red, green, and blue LEDs 961. The number of green LEDs may be larger than the number of red and blue LEDs, for example, preferably by about two times. However, the number of the LEDs may be changed if necessary, and alternate arrangements of LEDs are within the scope of these embodiments.

One or more polarizers (not shown) for polarizing the light from the lamp unit 960 are attached to the outer surfaces of the panels 100 and 200.

The optical components 910 include a reflector 904, a light guide plate 903, a spread plate 902, such as a diffusing plate, and at least one optical sheet 901.

The reflector 904 is disposed between the LC panel assembly 300 and the lamp unit 960. The reflector 904 has a plurality of light emitting holes of a predetermined size which are arranged at a predetermined interval for allowing the LEDs 961 to pass there through. The reflector 904 also reflects light not passing through the light emitting holes in a downward direction.

The light guide plate 903 is disposed over the reflector 904, such as between the reflector 904 and the spread plate 902, and has light blocking films formed on portions facing the respective LEDs 961. The light guide plate 903 uniformly maintains the intensity of light from the LEDs 961. The spread plate 902 guides and spreads light from the light guide plate 903 to the LC panel assembly 300.

The optical sheet or sheets 901 enhances luminance characteristics.

In FIG. 1, each light emitting hole formed on the reflector 904 has a circular shape such that the corresponding LED is projected through the hole. Although not illustrated, the reflector may alternatively include alternate shapes of light emitting holes such as a rectangular shape or a slit shape that are adapted to project a predetermined number of the LEDs 961. The internal lateral sides of the supporting frame 905 are inclined relative to an upper surface thereof, to reflect the light from the lamp unit 960 toward an upward direction towards the LC panel assembly 300.

As shown in FIG. 4, the power supply 950 includes a line filter 910, a bridge rectifier 920 connected to the line filter 910, a smoother 930 connected to the bridge rectifier 920, the bridge rectifier 920 connected between the line filter 910 and the smoother 930, and a DC-DC converter 940 connected to the smoother 930, the smoother 930 connected between the bridge rectifier 920 and the DC-DC converter 940. The power supply 950 is supplied with an AC voltage of about 90V to 220V, which is first received by the line filter 910.

Although not shown in FIG. 1, an upper case and a lower case are disposed on the front chassis 361 and the rear chassis 362, respectively, and combine with each other to substantially complete the LCD.

Now, the operation of the LCD will be described in detail with reference to FIGS. 1 to 4.

Referring to FIG. 2, the signal controller 600 is supplied with input red, green, and blue image signals R, G, and B and input control signals controlling the display thereof such as a vertical synchronization signal Vsync, a horizontal synchronization signal Hsync, a main clock MCLK, and a data enable signal DE from an external graphics controller (not shown). The signal controller 600 generates gate control signals CONT1, data control signals CONT2, and backlight control signals CONT3 and processing the image signals R, G, and B to be suitable for the operation of the panel assembly 300 on the basis of the input control signals and the input image signals R, G, and B. The signal controller 600 then provides the gate control signals CONT1 to the gate driver 400, the processed image signals DAT and the data control signals CONT2 to the data driver 500, and the backlight control signals CONT3 to the backlight assembly 900.

The gate control signals CONT1 include a scanning start signal STV having instructions to start scanning and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing the data driver 500 of a start of data transmission for a group of pixels, a load signal LOAD having instructions to apply the data voltages to the data lines $D_1$-$D_m$, and a data clock signal HCLK. The data control signal CONT2 may further include an inversion signal RVS for reversing the polarity of the data voltages with respect to the common voltage Vcom.

The backlight control signals CONT3 include a plurality of control signals such as pulse width modulation ("PWM") signals controlling the LEDs 961 of the lamp unit 960 and controlling the DC-DC converter 940 of the power supply 950.

In response to the data control signals CONT2 from the signal controller 600, the data driver 500 receives a packet of the image data DAT, the processed image signals, for the group of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q connected thereto. The data voltages applied to the data lines $D_1$-$D_m$ are supplied to the pixels through the activated switching elements Q.

The difference between the data voltage and the common voltage Vcom applied to a pixel is expressed as a charged voltage of the LC capacitor $C_{LC}$, i.e., a pixel voltage. The LC molecules have orientations depending on the magnitude of the pixel voltage.

As shown in FIG. 4, the DC-DC converter 940 of the power supply 950 in the backlight assembly 900 supplying driving voltages for the lamp unit 960 filters noise contained in an AC input voltage from the outside by using the line filter 910 to apply the AC input voltage to the bridge rectifier 920. The line filter has a turn ratio of "1" of a primary coil (not shown) and a secondary coil (not shown) such that loss of an output voltage with respect to the input voltage is not generated.

The bridge rectifier 920 half wave rectifies the AC input voltage from the line filter 910 to convert a DC voltage and applies the converted DC voltage to the smoother 930.

The DC voltage received from the bridge rectifier 920 has ripples smoothed by the smoother 930. The smoother 930 applies the smoothed DC voltage to the DC-DC converter 940.

The DC-DC converter 940 boosts the DC voltage inputted from the smoother 930 to a predetermined magnitude for driving the lamp unit 960 based on the backlight control signals CONT3, and outputs the boosted DC voltage to the lamp unit 960. The operations of the DC-DC converter 940 will be further described below.

The lamp unit 960 drives, based on the backlight control signals CONT3 and the DC voltage from the DC-DC converter 940 of the power supply 950, to turn on or turn off the LEDs 961. By a mix of the light of the red, green, and blue colors from the red, green, and blue LEDs 961, white light is emitted from the lamp unit 960.

The light from the backlight assembly 900 passes through the LC layer 3 and experiences a change of its polarization. The change of the polarization is converted into that of the light transmittance by the polarizers formed on exterior surfaces of the panels 100, 200.

By repeating this procedure by a unit of the horizontal period (which is denoted by "1H" and is equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS, part of the data control signals CONT2, applied to the data driver 500 is controlled such that the polarity of the data voltages is reversed (which is referred to as "frame inversion"). The inversion control signal RVS may also be controlled such that the polarity of the data voltages flowing in a data line in one frame are reversed (for example, line inversion and dot inversion), or the polarity of the data voltages in one packet are reversed (for example, column inversion and dot inversion).

Now, a DC-DC converter 940 according to an embodiment of the present invention will be described in detail with reference to FIGS. 4-6 and 7A to 7N.

Figure 5:
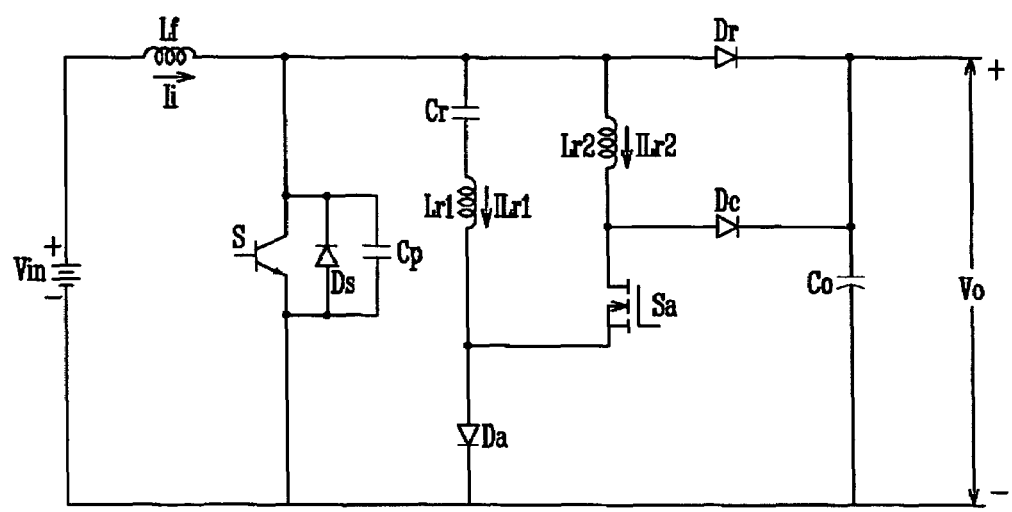
FIG. 5 is a circuit diagram of an exemplary DC-DC converter shown in FIG. 4.
Figure 6:
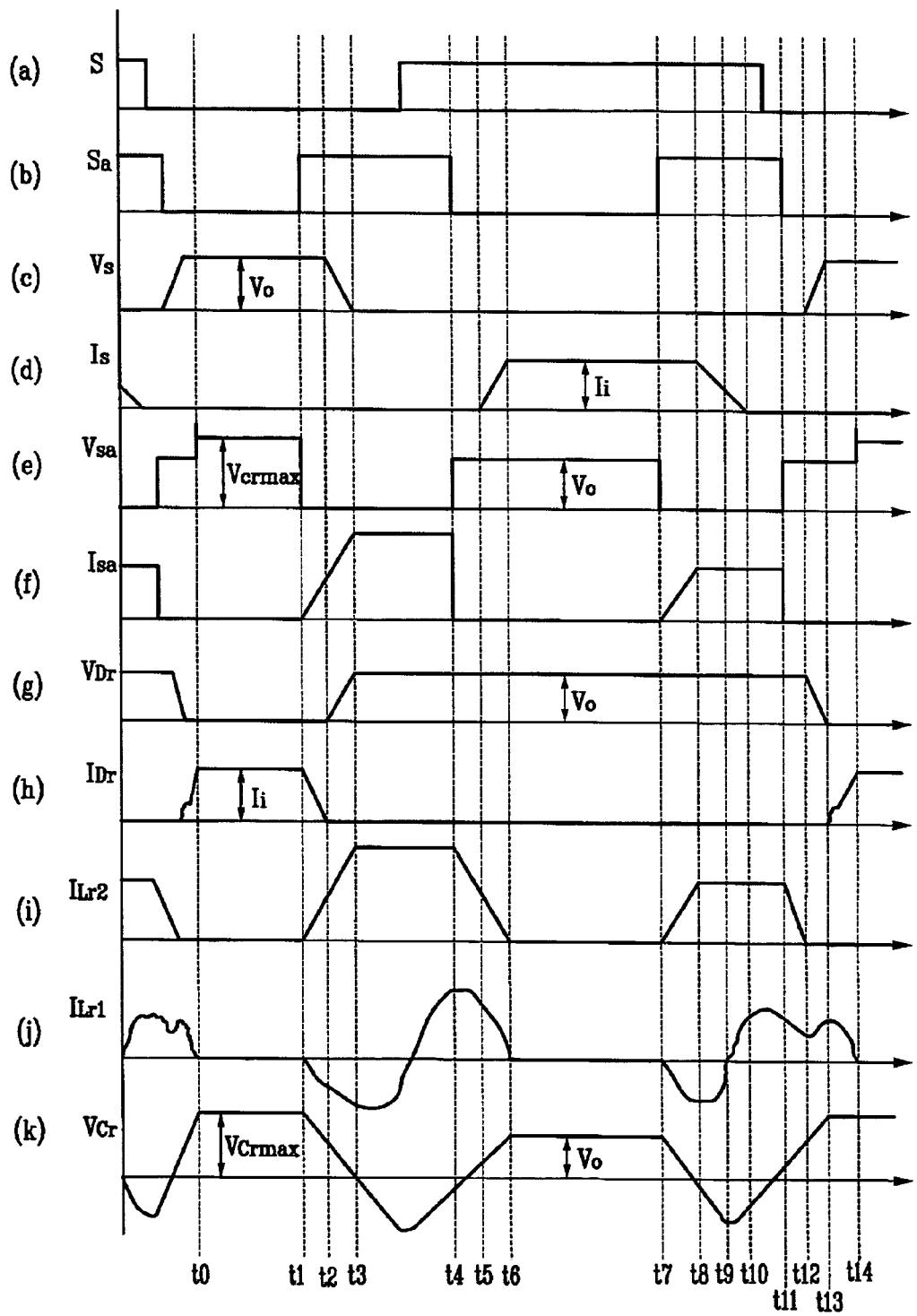
FIG. 6 illustrates waveforms detected at respective points of operation of the DC-DC converter shown in FIG. 4.
Figure 7A:
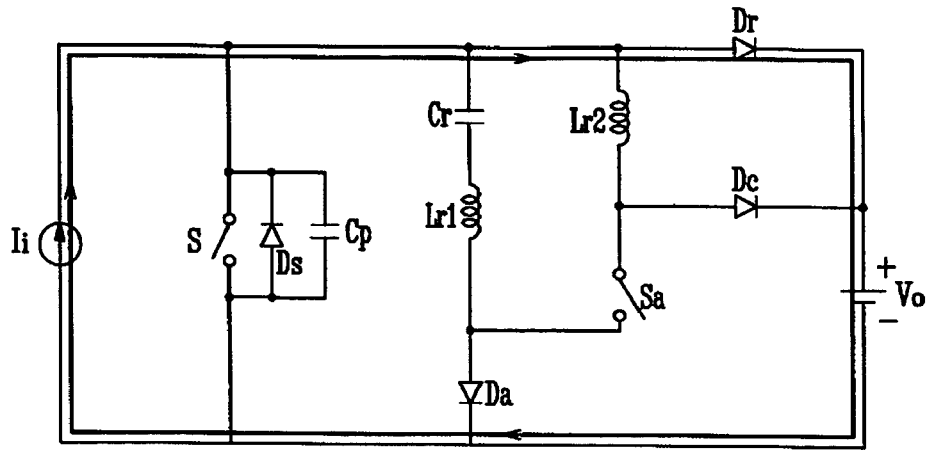
FIGS. 7A to 7N are equivalent circuits of the DC-DC converter and illustrate current flows in respective operating modes.
Figure 7B:
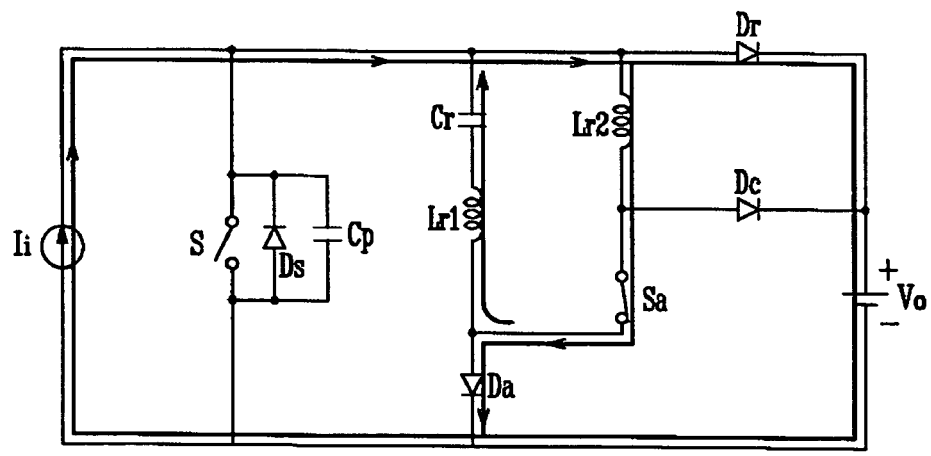
Figure 7C:
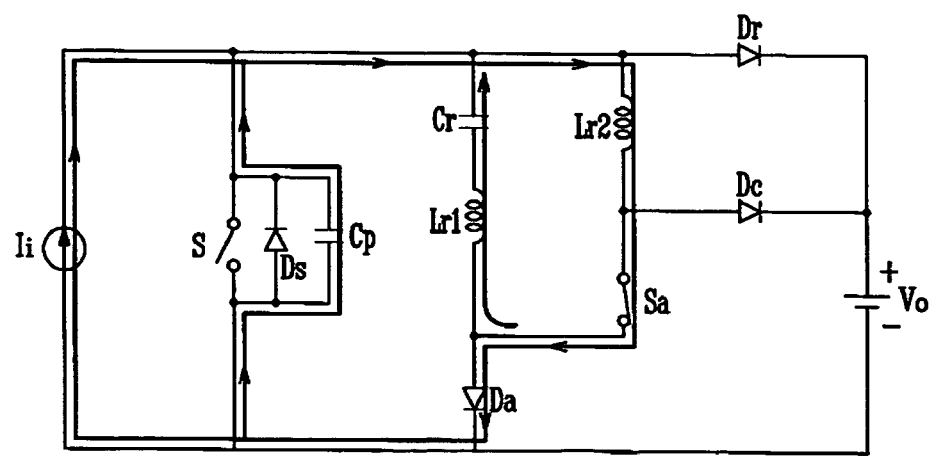
Figure 7D:
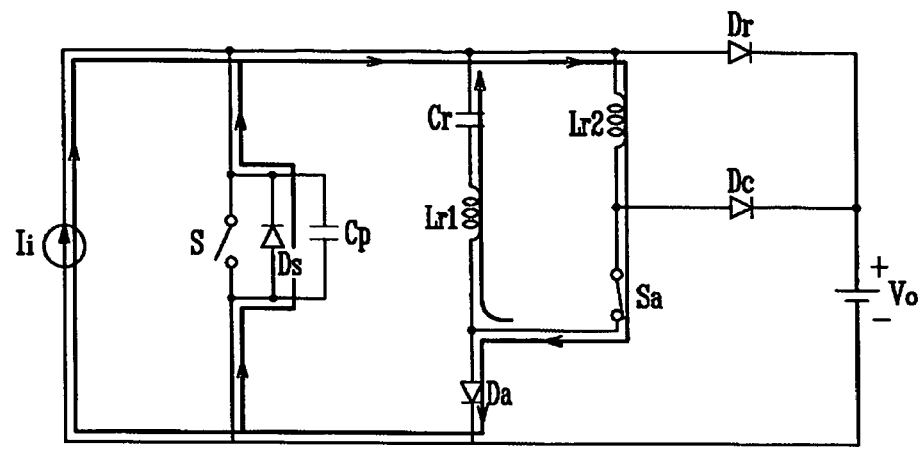
Figure 7E:
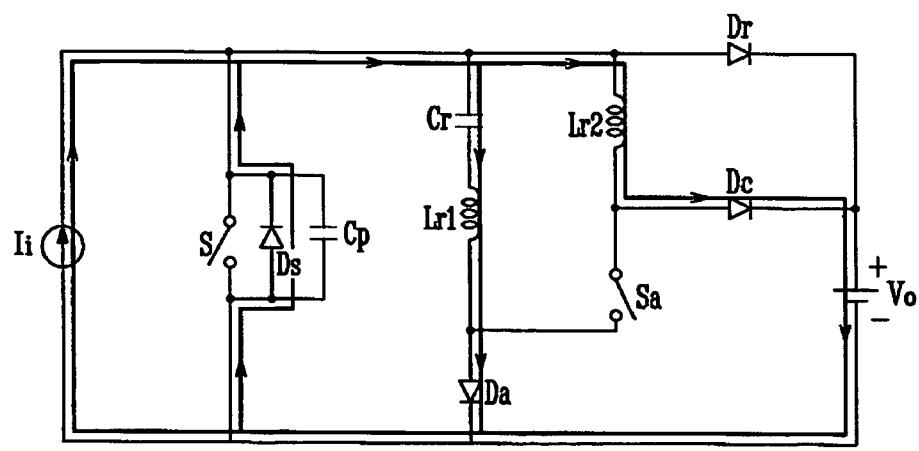
Figure 7F:
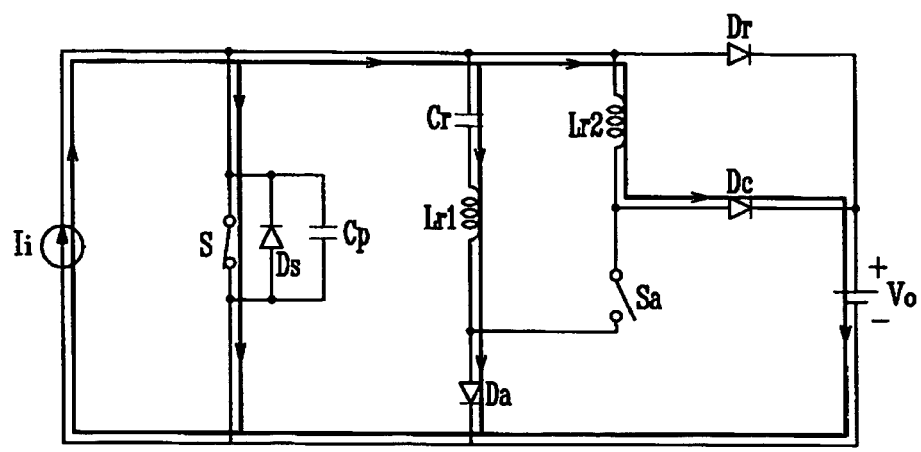
Figure 7G:
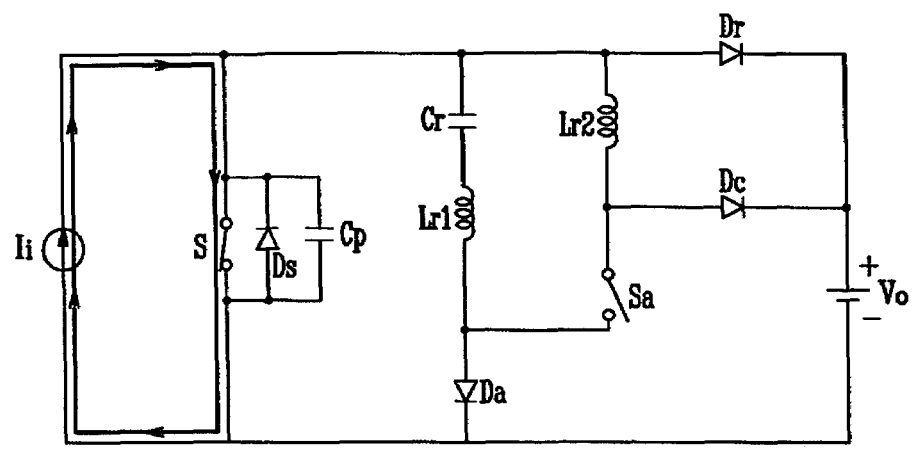
Figure 7H:
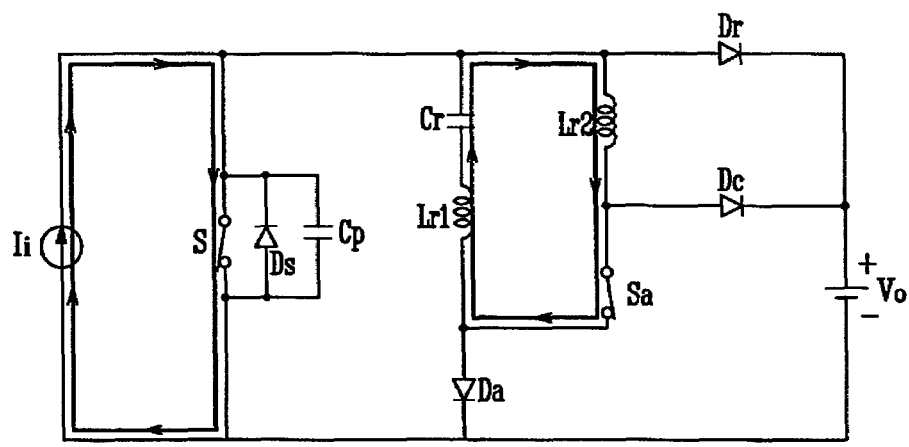
Figure 7I:
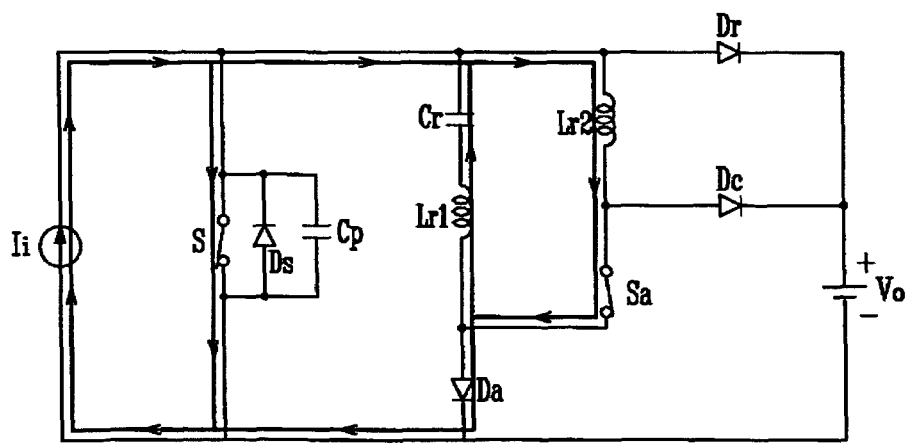
Figure 7J:
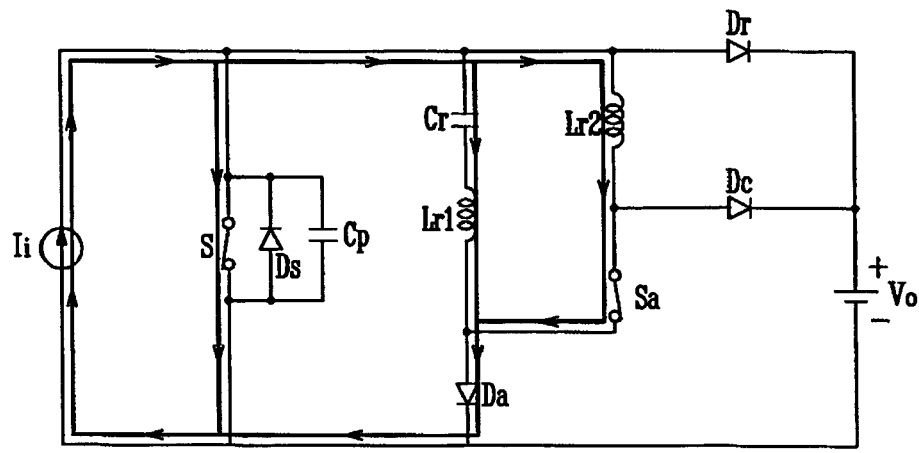
Figure 7K:
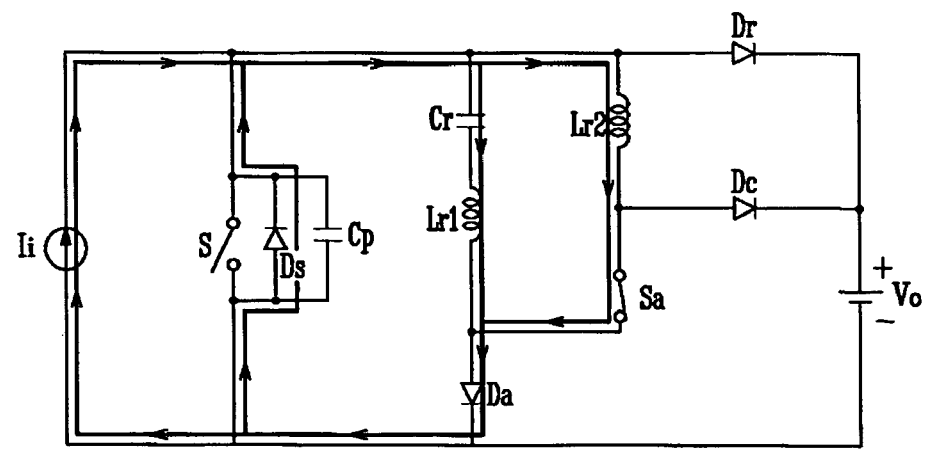
Figure 7L:
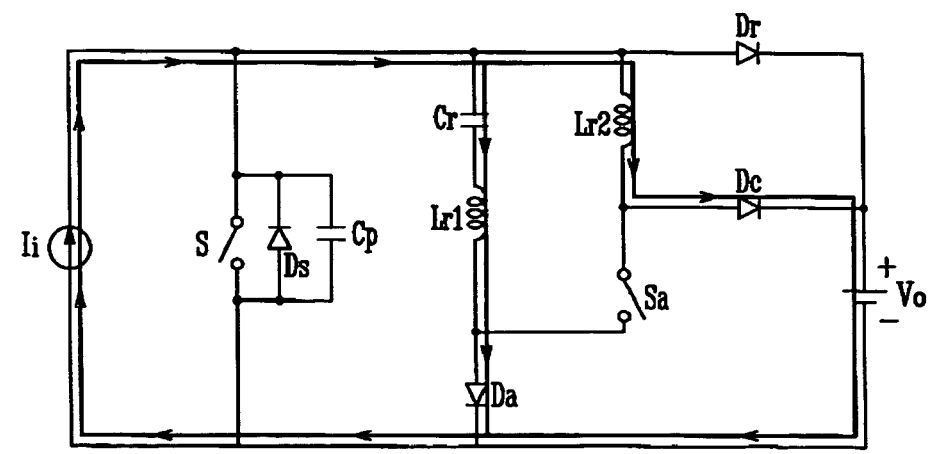
Figure 7M:
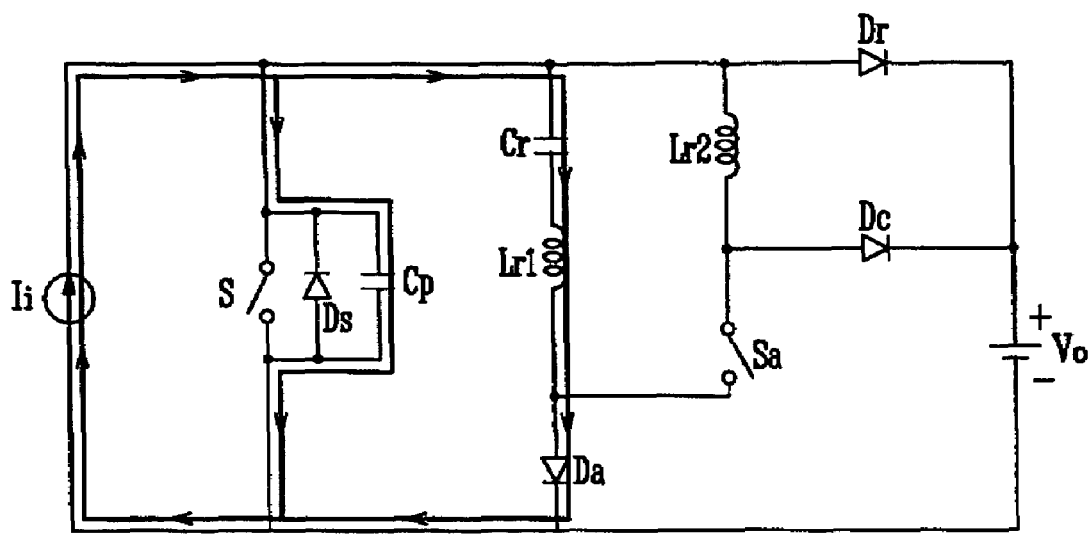
Figure 7N:
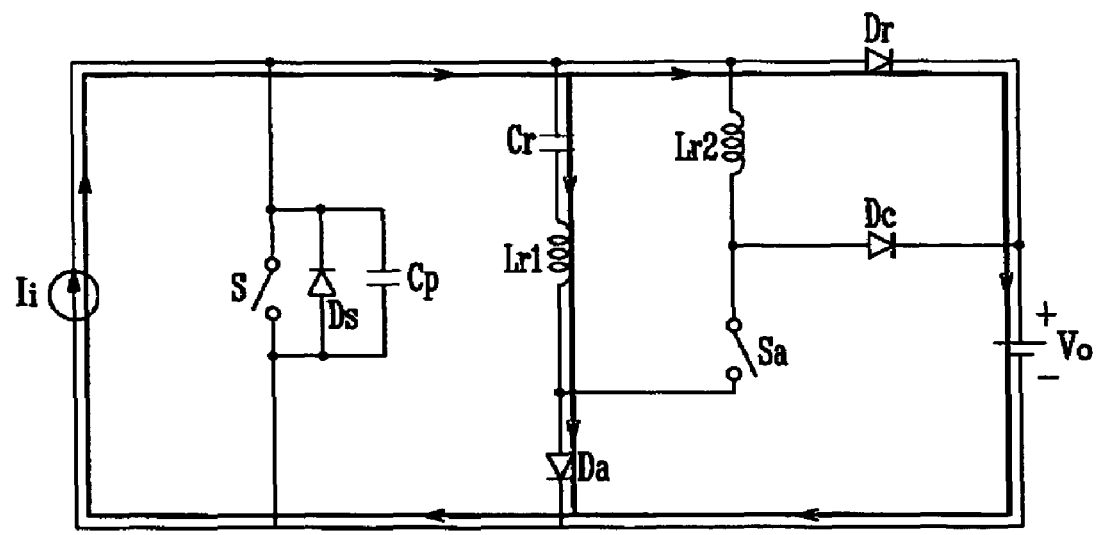

FIG. 5 is a circuit diagram of a DC-DC converter 940 shown in FIG. 4, FIG. 6 illustrates waveforms detected at respective points of the DC-DC converter 940 shown in FIG. 4, and FIGS. 7A to 7N are equivalent circuits of the DC-DC converter 940 and illustrate current flows in respective operating modes.

As shown in FIG. 5, the DC-DC converter 940 is a boost DC-DC converter and includes an inductor Lf supplied with a DC input voltage Vin from the smoother 930, a main switching element S connected in parallel between the inductor Lf and the input voltage Vin, and a diode Ds connected in parallel to both terminals of the main switching element S in a reverse direction from the main switching element S. That is, current flowing through the diode Ds flows in an opposite direction from current flowing through the main switching element S, and thus, current does not flow through both the diode Ds and the main switching element S at the same time. The DC-DC converter 940 also includes a parasitic capacitor Cp connected in parallel to the diode Ds, a capacitor Cr connected to the main inductor Lf, an inductor Lr1 connected in series to the capacitor Cr, a diode Da connected to the inductor Lr1 and the input voltage Vin in a forward direction from the inductor Lr1, an inductor Lr2 connected to the inductor Lf, an auxiliary switching element Sa connected between the inductors Lr2 and Lr1, a main diode Dr connected to the main inductor Lf in a forward direction from the main inductor Lf, a diode Dc commonly connected to the inductor Lr2 and the auxiliary switching element Sa in a forward direction from the inductor Lr2, and a capacitor Co connected to the diodes Dr and Dc and the input voltage Vin. The main switching element S is a bipolar junction transistor ("BJT"), and the auxiliary switching element Sa is a majority-carrier metal oxide silicon field effect transistor ("MOSFET"). However, the types of the switching elements may be changed, and such alternatives are within the scope of these embodiments.

The switching element S, the inductor Lf, and the diode Dr are a main switching element, a main inductor, and a main diode for DC-DC converting, respectively. Specifically, the main inductor Lf is an input filtering inductor. The diode Ds and the capacitor Cp are a parasitic diode and a parasitic capacitor generated in the main switching element S, respectively.

The capacitor Cr and the inductors Lr1 and Lr2 are elements for oscillating. The auxiliary switching element Sa is an auxiliary switching element for DC-DC converting. The diodes Da and Dc are auxiliary diodes also for DC-DC converting, and in particular the diode Dc is a diode for clamping.

The capacitor Co is an output capacitor.

The operations of the DC-DC converter 940 according to an embodiment of the present invention will now be described in detail.

For analyzing the operations of the DC-DC converter 940, it is assumed that an input current Ii and an output voltage Vo are constant for an operating period due to enough large capacity of the inductor Lf and the capacitor Co, and therefore main inductor Lf and output capacitor Co are not specifically illustrated in the following figures. Furthermore, for analyzing the operations of the DC-DC converter 940, it is assumed that all elements are ideal.

For description purposes, the DC-DC converter 940 has a total of 14 modes for an operating period according to an embodiment of the present invention, of course, the operating period may be divided into an alternate number of modes.

Mode 1 (t0-t1)

As shown in waveforms (a) and (b) of FIG. 6, the main switching element S and the auxiliary switching element Sa are respectively supplied with a signal with a low state, to make the switching elements S and Sa turn off.

The input voltage Vin is transmitted to a load, that is, the lamp unit 960, through the diode Dr as indicated in FIG. 7A. The current IDr of the diode Dr is equivalent to the input current Ii as demonstrated by waveform (h) of FIG. 6. At this time, the capacitor Cr is charged to a maximum voltage Vcrmax, as demonstrated by waveform (k) of FIG. 6.

Mode 2 (t1-t2)

At this time, the main switching element S is still turned off and the auxiliary switching element Sa is turned on as demonstrated by the waveforms (a) and (b) of FIG. 6. Accordingly, as shown in FIG. 7B, the turned on auxiliary switching element Sa and the capacitor Cr and the inductors Lr1 and Lr2 for oscillating form a closed circuit. A current flows through the auxiliary element Sa and the diode Da.

Accordingly, the current flows through the closed circuit by the oscillation generated by the capacitor Cr and the inductors Lr1 and Lr2 such that a voltage Vcr charged in the capacitor Cr comes to gradually decrease as demonstrated by waveform (k) of FIG. 6, and currents ILr1 and ILr2 flowing through the inductors Lr1 and Lr2 come to gradually increase, as demonstrated by waveforms (i) and (j). At this time, since the currents ILr1 and ILr2 flow in opposite directions from each other, the current ILr1 has a (−) direction.

By the oscillation, the diode Da is turned on, and thereby a current flowing through the turned-on diode Da comes to gradually increase by adding the current flowing in the closed circuit formed by the capacitor Cr and the inductors Lr1 and Lr2 to the input current Ii. However, since the current IDr flowing through the diode Dr also flows through the closed circuit, the current IDr comes to gradually decrease from a maximum equivalent to the input current Ii to a minimum current as demonstrated by waveform (h) of FIG. 6.

Mode 3 (t2-t3)

At this time, the main switching element S is turned off and the auxiliary switching element Sa is turned on as shown in FIG. 7C. When a magnitude of the current flowing through the diode Da reaches a magnitude of the input current Ii, the diode Dr is turned off such that the current flowing through the diode Dr is cut off and the diode Dr is turned off by zero voltage switching, as demonstrated by waveform (h) of FIG. 6. At this time, the parasitic capacitor Cp of the main switching element S comes to discharge the charges after the charging such that the oscillation by the capacitor Cp and the inductor Lr2 begins. Thus, the current flowing through the diode Da passes through the parasitic capacitor Cp.

Mode 4 (t3-t4)

When the main switching element S is turned off and the auxiliary switching element Sa is turned on, as shown in FIG. 7D, the discharging of the capacitor Cp is maintained so that the current ILr2 flowing to the inductor Lr2 reaches a maximum as demonstrated by waveform (i) of FIG. 6. At this time, since the current flowing via the diode Da is larger than the input current Ii, the diode Ds is turned on to flow a current. When the current ILr2 flowing through the inductor Lr2 reaches the maximum, all the energy charged in the capacitor Cp is moved into the inductor Lr2. Thus, the flowing of the current is moved into the diode Ds from the capacitor Cp, to turn on the diode Ds. At this time, the current flowing via the diode Da is gradually decreased, but the diode Ds maintains the turned-on state until a magnitude of the current flowing via the diode Da is less than that of the input current Ii.

The current flow is diverted away from the main switching element S and sent through the diode Ds while the main switching element S is being turned on. Accordingly, for the turn on of the diode Ds, when the main switching element S is turned on as demonstrated by waveform (a) of FIG. 6, the zero voltage switching and the zero current switching are simultaneously generated.

Mode 5 (t4-t5):

At this time, the main switching element S is turned on and the auxiliary switching element Sa is turned off. In the mode 4, when all the energy charged in the capacitor Cr is moved into the inductor Lr2, the current flowing through capacitor Cr is reversed to gradually increase the charge voltage Vcr of the capacitor Cr as demonstrated by waveform (k) of FIG. 6. In this state, when the auxiliary switching element Sa is turned off, as shown in FIG. 7E, the current ILr2 flowing through the inductor Lr2 flows toward the diode Dc to be applied to the load, which is the lamp unit 960. Thus, the current ILr2 flowing through the inductor Lr2 begins to decrease as demonstrated by waveform (i) of FIG. 6.

In addition, the current ILr1 flows toward the diode Da, and therefore gradually decreases as demonstrated by waveform (j) of FIG. 6. As previously described with respect to mode 4, as long as the magnitude of the current flowing through the diode Da does not decrease to that of the input current Ii, the diode Ds maintains a turned-on state and the current continues to flow through the diode Ds. Thus the main switching element S continuously maintains the zero voltage switching state.

Mode 6 (t5-t6)

At this time, the main switching element S maintains the turned-on state and the auxiliary switching element Sa maintains the turned-off state. The sum of the currents ILr1 and ILr2 flowing through the inductors Lr1 and Lr2, respectively gradually being decreased from "t4", is less than the magnitude of the input current Ii at "t5." Since the current flowing via the diode Da is no longer larger than the input current Ii, the diode Ds is no longer turned on to flow a current, and the current instead flows through the main switching element S in the opposite direction. The current increase through the main switching element S is demonstrated by waveform (d) of FIG. 6. Thus, the auxiliary switching element Sa maintains the turned-off state such that a voltage applied to both terminals of the auxiliary switching element Sa maintains an output voltage Vo. This mode is illustrated in FIG. 7F.

Mode 7 (t6-t7):

At this time, the main switching element S maintains the turned-on state and the auxiliary switching element Sa maintains the turned-off state. The magnitude of the current Is flowing through the main switching element S in the mode 6 reaches the magnitude of the input current Ii, as demonstrated by waveform (d) of FIG. 6, and the equivalent circuit of the DC-DC converter 940 is as shown in FIG. 7G. That is, only one current flows through the main switching element S. Thus, the energy from the input voltage Vin is continuously charged in the main inductor Lf, as shown in FIG. 5, and the energy charged in the output capacitor Co, also as shown in FIG. 5, is transmitted into the lamp unit 960.

Mode 8 (t7-t8):

At this time, the main switching element S and the auxiliary switching element Sa are both turned on, as demonstrated by waveforms (a) and (b) in FIG. 6. By turning on the auxiliary switching element Sa, an oscillation is generated by the capacitor Cr and the inductors Lr1 and Lr2 as shown in FIG. 7H and the current Is a flowing through the auxiliary switching element Sa increases as demonstrated by waveform (f) of FIG. 6. Thus, the currents ILr1 and ILr2 begin to increase, as demonstrated by waveforms (i) and (j) of FIG. 6, until a voltage VCr charged in the capacitor Cr is entirely discharged, as demonstrated by waveform (k) of FIG. 6. In this case, the diode Da is not turned off yet due to voltage drop generated by the capacitor Cr and the inductor Lr1.

At this time, the charged voltage of the capacitor Cr is changed such that the auxiliary switching element Sa is in a zero current switching state.

Mode 9 (t8-t9)

At this time, the main switching element S and the auxiliary switching element Sa are maintained in the turned-on state. The currents ILr1 and ILr2 of the inductors Lr1 and Lr2 reach the maximum as shown in waveforms (i) and (j) at "t8", and thereby the diode Da is turned on. Thus, since the current flowing through the diode Da increases, the current Is flowing through the main switching element S decreases as demonstrated by waveform (d) of FIG. 6. As shown in FIG. 7I, the input current Ii begins to flow though the inductor Lr2 such that an oscillation among the inductors Lr1 and Lr2 and the capacitor Cr is generated. Thus, a flowing direction of the current ILr1 flowing through the inductor Lr1 is changed as demonstrated by waveform (j) of FIG. 6.

Mode 10 (t9-t10)

At this time, the main switching element S and the auxiliary switching element Sa are maintained in the turned-on state. As shown in FIG. 7J, the capacitor Cr begins to charge such that the charged voltage Vcr increases as demonstrated by waveform (k) of FIG. 6, and the flowing direction of the current ILr1 flowing through the inductor Lr1 is changed as demonstrated by waveform (j) of FIG. 6. Until the magnitude of the current of the diode Da begins to increase in the mode 9 to reach that of the input current Ii, the current continuously flows through the main switching element S, but the current Is is continuously decreased, as demonstrated by waveform (d) of FIG. 6, as the increment of the current flowing through the diode Da. A magnitude of the current ILr1 flowing through the inductor Lr1 is less than that of the input current Ii, as demonstrated by waveform (j) of FIG. 6.

Mode 11 (t10-t11)

The main switching element S is turned off and the auxiliary switching element Sa is maintained in the turned-on state, as demonstrated by waveforms (a) and (b) of FIG. 6. When the magnitude of the current flowing through the diode Da is larger than that of the input current Ii, the diode Ds is turned on as shown in FIG. 7K, to flow the remaining current which did not flow toward the input voltage Vin. At this time, the turned-on operation of the diode Ds is zero current switching. For the turn on of the diode Ds, the main switching element S is turned off to generate zero voltage switching. Accordingly, the zero voltage switching and the zero current switching are simultaneously generated.

Mode 12 (t11-t12)

At this time, as shown in FIG. 7L, the main switching element S maintains the turned-off state and the auxiliary switching element Sa is also turned off, as demonstrated by waveforms (a) and (b) of FIG. 6. By the turn-off of the auxiliary switching element Sa, the energy charged in the inductor Lr2 is transmitted into the lamp unit 960 via the diode Dc.

Thus, the current ILr2 flowing through the inductor Lr2 is gradually decreased as demonstrated by waveform (i) of FIG. 6. In addition, by the energy transmission to the load, the lamp unit 960, the current flowing through the diode Ds is gradually decreased and finally does not flow, as illustrated in FIG. 7L. However, the current through the capacitor Cr, the inductor Lr1, and the diode Da is maintained and the main switching element S maintains the zero voltage switching state. Moreover, the voltage Vsa applied to both terminals of the auxiliary switching element Sa maintains the output voltage Vo, as demonstrated by waveform (e) of FIG. 6.

Mode 13 (t12-t13)

At this time, as shown in FIG. 7M, the main switching element S and the auxiliary switching element Sa maintain the turned-off state. The energy which began to be transmitted toward the load is all transmitted into the load such that the magnitude of the current ILr2 becomes "0" as demonstrated by waveform (i) of FIG. 6 to turn off the diode Dc.

Thus, a portion of the input current Ii flows through the capacitor Cp such that the capacitor Cp is charged to a magnitude of the output voltage Vo. At this time, although a current flows through the capacitor Cr and the inductor Lr1 due to the increment of the current ILr1, the potential difference between both terminals of the diode Da does not become a zero voltage.

Mode 14 (t13-t14):

At this time, as shown in FIG. 7N, the main switching element S and the auxiliary switching element Sa continuously maintain the turned-off state. When a magnitude of the charged voltage in capacitor Cr reaches output voltage Vo as demonstrated by waveform (k) of FIG. 6, the input current Ii flows through the diode Dr, as demonstrated by waveform (h) of FIG. 6, as well as the capacitor Cr such that the diode Dr is turned on, and thereby a voltage applied to both terminals of the diode Dr is a zero voltage as demonstrated by waveform (g) of FIG. 6. Moreover, the difference between the charged voltage in the capacitor Cr and a voltage applied to both terminals of the inductor Lr1 define the magnitude of the output voltage Vo.

As shown in FIG. 6, a magnitude of the current IDr, as demonstrated by the waveform (h), flowing through the diode Dr at "t14" reaches that of the input current Ii at "t0," and a charged voltage in the capacitor Cr reaches the maximum Vcrmax, as demonstrated by the waveform (k) of FIG. 6. The current ILr2 is clamped, as demonstrated by waveform (i) of FIG. 6, by the diode Dc.

According to the present invention, when the main switching element and the main diode are turned on or off, a zero voltage switching state or a zero current switching state comes about by the operations of the auxiliary switching element of the majority-carrier semiconductor elements to decrease the switching loss of the switching elements. Furthermore, in one exemplary embodiment, when the main switching element is turned on or off, zero voltage switching and zero current switching are simultaneously generated, thus preventing a switching loss. Similarly, when the main diode is turned on or off, a zero voltage is applied to both terminals of the main diode. In addition, the present invention may be applicable to a switching element of the minority-carrier semiconductor elements.

Moreover, current and voltage stress is decreased, and thereby the operational efficiency of the DC-DC converter improves.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A DC-DC converter including a main inductor connected to an input voltage, a main switching element connected in series to the main inductor, a main diode connected to the main inductor and a load, and a main capacitor connected to the main diode and the load, the DC-DC converter changing the input voltage to output a changed input voltage as an output voltage, the DC-DC converter comprising:

an oscillator connected between the main inductor and the main diode;

an auxiliary switching element connected between first and second inductors of the oscillator, the auxiliary switching element changing an operation state of the auxiliary switching element based on an externally applied control signal to control the oscillator; and a diode unit connected to the oscillator and the auxiliary switching element and controlling current flow, based on operations of the oscillator and the auxiliary switching element, to change the output voltage, wherein the main switching element and the main diode are to be zero voltage switching or zero current switching in accordance with the operations of the oscillator and the auxiliary switching element.

2. The DC-DC converter of claim 1, wherein the oscillator comprises:
a first capacitor connected in parallel to the main switching element;
the first inductor connected between the first capacitor and the main diode; and
the second inductor connected between the first capacitor and the auxiliary switching element.

3. The DC-DC converter of claim 1, wherein the main switching element is a semiconductor device of a type different from that of the auxiliary switching element.

4. The DC-DC converter of claim 3, wherein the auxiliary switching element is a metal oxide silicon field effect transistor.

5. The DC-DC converter of claim 1, wherein the diode unit comprises a first diode connected to the oscillator and the auxiliary switching element and controlling the current flow based on the operations of the oscillator and the auxiliary switching element and a second diode connected to the oscillator and the auxiliary switching element and controlling a current flowing from the oscillator into the load based on an operation of the auxiliary switching element.

6. The DC-DC converter of claim 5, wherein the second diode is a diode for clamping.

7. The DC-DC converter of claim 1 wherein, when the main switching element is being turned on or off, both zero current switching and zero voltage switching are generated.

8. The DC-DC converter of claim 1 wherein the auxiliary switching element is in a turned-on state when the main switching element is being turned on or off.

9. A DC-DC converter comprising:
a first inductor connected to an input end;
a first switching element connected to the first inductor and the input end;
a first diode connected between the first inductor and an output end;
a first capacitor connected between the first diode and the output end;
an oscillating unit connected between the first inductor and the first diode, the oscillating unit including a second capacitor connected to the first inductor, a second inductor connected between the second capacitor and the first diode, and a third inductor connected in series with the second capacitor;
a second switching element connected between the second and third inductors of the oscillating unit;
a second diode connected between the second switching element and the input end; and
a third diode connected between the oscillating unit and the first diodes;
wherein, during operation of the DC-DC converter, a current flowing through the third inductor changes direction while current flowing through the second inductor flows in a constant direction.

10. The DC-DC converter of claim 9, further comprising a fourth diode connected in parallel to both terminals of the first switching element and a third capacitor connected in parallel to the fourth diode, wherein the second capacitor of the oscillating unit is connected in parallel to the first switching element.

11. The DC-DC converter of claim 9, wherein the first switching element is a semiconductor device of a type different from that of the second switching element.

12. The DC-DC converter of claim 11, wherein the second switching element is a metal oxide silicon field effect transistor.

13. The DC-DC converter of claim 9 wherein, when the first switching element is being turned on or off, both zero current switching and zero voltage switching are generated.

14. The DC-DC converter of claim 9 wherein the second switching element is in a turned-on state when the first switching element is being turned on or off.

* * * * *